United States Patent
Masi et al.

(10) Patent No.: US 10,434,689 B2
(45) Date of Patent: Oct. 8, 2019

(54) OPTICALLY VARIABLE DEVICE (OVD) IMAGES EMBEDDED WITHIN PLASTIC STRIPS

(75) Inventors: George V. Masi, Toms River, NJ (US); Mark Mancilla, Doylestown, PA (US)

(73) Assignee: Nekoosa Corporation, Nekoosa, WI (US)

( * ) Notice: Subject to any disclaimer, the term of this patent is extended or adjusted under 35 U.S.C. 154(b) by 0 days.

(21) Appl. No.: 13/156,387

(22) Filed: Jun. 9, 2011

(65) Prior Publication Data
US 2012/0313365 A1   Dec. 13, 2012

(51) Int. Cl.
| | |
|---|---|
| *B29C 43/22* | (2006.01) |
| *B29C 48/00* | (2019.01) |
| *B29C 48/92* | (2019.01) |
| *B29C 48/07* | (2019.01) |
| *G02B 5/18* | (2006.01) |
| *B29C 59/02* | (2006.01) |

(Continued)

(52) U.S. Cl.
CPC ........ *B29C 43/222* (2013.01); *B29C 48/0011* (2019.02); *B29C 48/92* (2019.02); *G02B 5/1828* (2013.01); *G02B 5/1852* (2013.01); *B29C 48/002* (2019.02); *B29C 48/07* (2019.02); *B29C 2059/023* (2013.01); *B29C 2948/92704* (2019.02); *B42D 25/328* (2014.10); *B42D 25/355* (2014.10)

(58) Field of Classification Search
CPC .......... B42D 1/00; B42D 19/00; B42D 15/00; B42D 25/328; B42D 25/355; G03F 1/00; G03F 7/00; B29C 47/004; B29C 47/92; B29C 43/222; B29C 2947/92704; B29C 47/0019; B29C 47/0061; B29C 2059/023; G02B 5/1852; G02B 5/1828

USPC ............ 281/2, 5, 6, 7, 8, 9; 283/61, 62, 86; 430/321; 156/219, 272.2, 275.5, 308.2, 156/309.6
See application file for complete search history.

(56) References Cited

U.S. PATENT DOCUMENTS

| | | | |
|---|---|---|---|
| 5,200,253 A | | 4/1993 | Yamaguchi |
| 5,250,133 A | * | 10/1993 | Kawamura et al. ............ 283/77 |
| 5,331,443 A | | 7/1994 | Stanisci ........................... 359/2 |

(Continued)

FOREIGN PATENT DOCUMENTS

GB    2181993 A  *  5/1987

OTHER PUBLICATIONS

JDSU, 2009—News Release, JDSU Increases Security of Identity Documents with HoloFuse™ Authentication Technology, May 2009.
EP12171048 Search Report dated Sep. 18, 2013.

*Primary Examiner* — Justin V Lewis
(74) *Attorney, Agent, or Firm* — Gregory S. Rosenblatt; Jonathan D. Hall; Wiggin and Dana LLP

(57) ABSTRACT

A method for the manufacture of a polymer strip useful to secure information contained on a face of a card includes the steps of extruding a polymer resin to form an optically transparent strip and then embossing an optically variable device into a first surface of this optically transparent strip. A time from when the optically transparent strip exits an extruder until embossing is effective to prevent the optically transparent strip from cooling to a temperature below 120° C. Subsequent to embossing, the optically variable device may be entirely or partially metalized. Alternatively, or in addition, to the metallization, security features may be formed into that first surface.

13 Claims, 3 Drawing Sheets

(51) Int. Cl.
    *B42D 25/355* (2014.01)
    *B42D 25/328* (2014.01)

(56) References Cited

U.S. PATENT DOCUMENTS

| | | | | |
|---|---|---|---|---|
| 5,492,370 | A * | 2/1996 | Chatwin | B41M 3/14 283/107 |
| 5,743,981 | A | 4/1998 | Lu | |
| 5,815,292 | A | 9/1998 | Walters | 359/2 |
| 5,838,466 | A | 11/1998 | Mallik | |
| 5,945,042 | A | 8/1999 | Mimura | |
| 6,896,755 | B1 | 5/2005 | Weder | 156/209 |
| 7,429,063 | B2 * | 9/2008 | Scharner | B21B 1/227 283/109 |
| 7,713,616 | B2 * | 5/2010 | Kuntz | B41M 3/144 283/72 |
| 2003/0124436 | A1 * | 7/2003 | Shioda et al. | 283/86 |
| 2003/0203230 | A1 | 10/2003 | Pellingra | |
| 2004/0144479 | A1 | 7/2004 | Cueli | 156/230 |
| 2006/0228530 | A1 | 10/2006 | Bi et al. | 428/195.1 |
| 2007/0195392 | A1 | 8/2007 | Phillips et al. | 359/15 |
| 2008/0290649 | A1 * | 11/2008 | Klein | B41M 3/144 283/86 |
| 2009/0009668 | A1 | 1/2009 | Tan et al. | 349/1 |
| 2009/0251749 | A1 | 10/2009 | O'Boyle | |
| 2010/0090455 | A1 * | 4/2010 | Boswell | B41F 11/02 283/57 |
| 2010/0266935 | A1 * | 10/2010 | Albert | B29C 43/222 430/2 |
| 2012/0018994 | A1 * | 1/2012 | Stalker et al. | 283/100 |

\* cited by examiner

OPTICALLY VARIABLE DEVICE (OVD) IMAGES EMBEDDED WITHIN PLASTIC STRIPS

CROSS REFERENCE TO RELATED APPLICATION(S)

N.A.

U.S. GOVERNMENT RIGHTS

N.A.

BACKGROUND OF THE INVENTION

Field of the Invention

This invention relates to a method to manufacture an optically transparent plastic strip, that could be film or sheet, used to secure information contained on a credit card or identification card. More particularly, an optically variable device, such as a diffractive pattern or hologram, is embossed into a thermoplastic during an extrusion process.

Description of the Related Art

The use of plastic strips with overt and covert security features has become prevalent in the manufacture of secure cards used in applications such as financial transactions and identification cards. Plastic strips with laser engravable additives have added to the functionality and the ability to secure such cards. To further enhance the security of the card, diffractive structures, such as holograms, are added to a secondary film, and then the secondary film is laminated to a plastic overlay. Alternatively, the secondary film is bonded to the plastic overlay by hot stamping. In yet another alternative, secondary diffractive coatings are cast onto a polycarbonate film. To protect the integrity of the diffractive structure, the secondary film is usually covered with a topcoat.

The use of a secondary film increases cost and complexity. The bond between the secondary film and the plastic overlay film creates a possible security risk by forming a potentially separable layer to the overall structure. The necessity of a protective topcoating adds further complexity to the overall construction.

U.S. Pat. No. 5,331,443 discloses a composite film having a hologram embossed into one film layer and coated with a reflective metalized layer. A laser selectively etches unique indicia into the metalized layer. The composite film is bonded to a substrate that may be transparent or opaque.

U.S. Pat. No. 5,815,292 discloses a first transparent film layer that is embossed with a first surface relief diffracting pattern and partially coated with a first metallization layer. The first transparent film layer is bonded to a second transparent film layer having a second surface relief diffracting pattern and coated with a second metallization layer. The film assembly is then bonded to a substrate to be authenticated with an adhesive. The adhesive is stronger than any of the film assembly bonds such that the assembly will be damaged if an attempt is made to remove it from the substrate.

United States Published Patent Application, Publication No. US 2009/0251749 A1, discloses a hologram containing overlay for fusing to a substrate. The overlay has a polycarbonate base, a diffractive pattern is formed on the base and coated with a reflection enhancing layer. The diffractive layer is preferably applied by a casting process, although embossing may be utilized. Embossed holograms are disclosed to be less desirable than cast holograms because the conventional embossed hologram base is a thermo compliant material; thus the image is formed by applying pressure only. As a result, it is subject to distortion in a vigorous lamination or embedding process required for polycarbonate card manufacturing.

Each of U.S. Pat. Nos. 5,331,443 and 5,815,292 and Publication No. US 2009/0251749 A1 is incorporated by reference herein in its entirety.

There remains a need for a method to emboss a diffractive structure directly into a plastic strip, without a need to subsequently apply a protective topcoating, that provides not only advantages in reduced complexity and cost, but also enhances the overall security of the structure as the diffractive image is within the film, and can only be removed or altered by destroying the plastic strip.

BRIEF SUMMARY

In a first embodiment, a method for the manufacture of a plastic strip useful to secure information contained on a face of a secure card or document is disclosed. The method includes extruding a polymer resin to form an optically transparent sheet and then embossing an optically variable device into a first surface of this optically transparent sheet.

In a second embodiment, a plastic strip useful to secure information contained on a face of a secure card or document is disclosed. This strip has an optically transparent substrate with a nominal thickness and an optically variable device embossed into a first surface of that optically transparent substrate.

The details of one or more embodiments are set forth in the accompanying drawings and the description below. Other features, objects and advantages of the invention will be apparent from the description and drawings, and from the claims.

BRIEF DESCRIPTION OF THE DRAWINGS

Like reference numbers and designations in the various drawings indicated like elements.

DETAILED DESCRIPTION

The following definitions apply throughout this patent application. A "film" has a nominal thickness of between 0.001 inch and 1/32 inch. A "sheet" has a nominal thickness in excess of 1/32 inch. A "strip" encompasses both film and sheet. "Optically transparent" means that text, numbers, figures and the like on one side of the strip may be accurately scanned by an electronic device or accurately perceived by a person from the opposing side of the strip even though the light transmission through the strip may be less than 100%.

Figure 1:
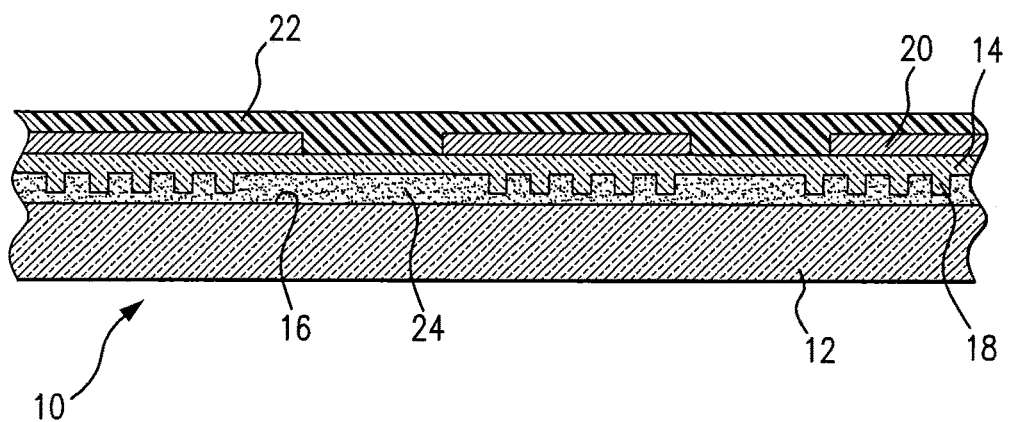
FIG. 1 is a cross-sectional representation of a plastic strip having a diffractive structure bonded to one surface thereof, as known from the prior art.

FIG. 1 shows in cross-sectional representation, a plastic strip 10 as known from the prior art. The plastic strip 10 may be used to authenticate information contained on a secured device, such as a credit card, driver's license or passport. The authenticity of the information, such as a picture or a social security number is secured by anti-counterfeiting characteristics of the plastic strip 10.

The plastic strip 10 includes an optically transparent plastic film layer 12 and a security layer 14 bonded together at a first surface 16 of the optically transparent plastic film layer 12. The security layer 14 is a plastic film layer that has an optically variable device (OVD) 18, such as a diffractive structure, for example, a hologram, formed thereon such as by casting or embossing. The security layer 14 further has a metalized layer 20, such as a layer of aluminum. Portions of the metalized layer may be removed, such as by chemical etching or laser ablation, to leave a reflective pattern that contributes to the uniqueness of the plastic strip 10. A protective coating layer 22 prevents damage to the OVD 18 and to the reflective pattern.

The security layer 14 is bonded to the first surface 16 of the optically transparent film layer 12, such as by an adhesive 24. However, the integrity of the information may be compromised if the security layer can be peeled away. It is also known to cast the optically variable device 18 directly on the first surface 16, however, that process has been found to be slow and to add complexity to the overall construction of the plastic strip.

Figure 2:
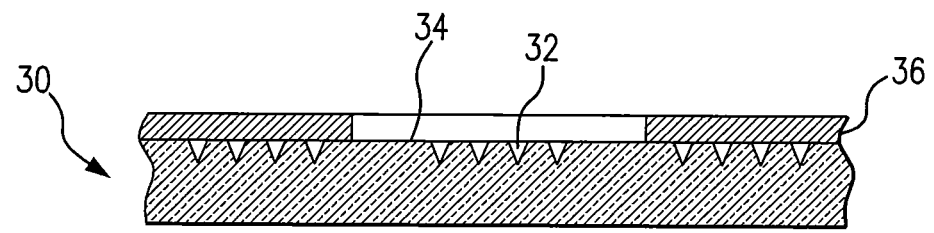
FIG. 2 is a cross sectional representation of a plastic strip with a diffractive structure embossed into a surface thereof, in accordance with an embodiment of the present disclosure.

FIG. 2 is a cross sectional representation of a plastic substrate 30 in accordance with an embodiment of the present disclosure. The plastic substrate 30 is formed from a mechanically deformable, optically transparent polymer, such as polycarbonate or other thermoplastic resin. This polymer is compounded, as described below, to include an additive to facilitate laser engraving, such as carbon black. An optically variable device 32, such as a diffractive structure, for example, a hologram, is embossed directly into a first surface 34 of the plastic substrate 30.

Figure 3:
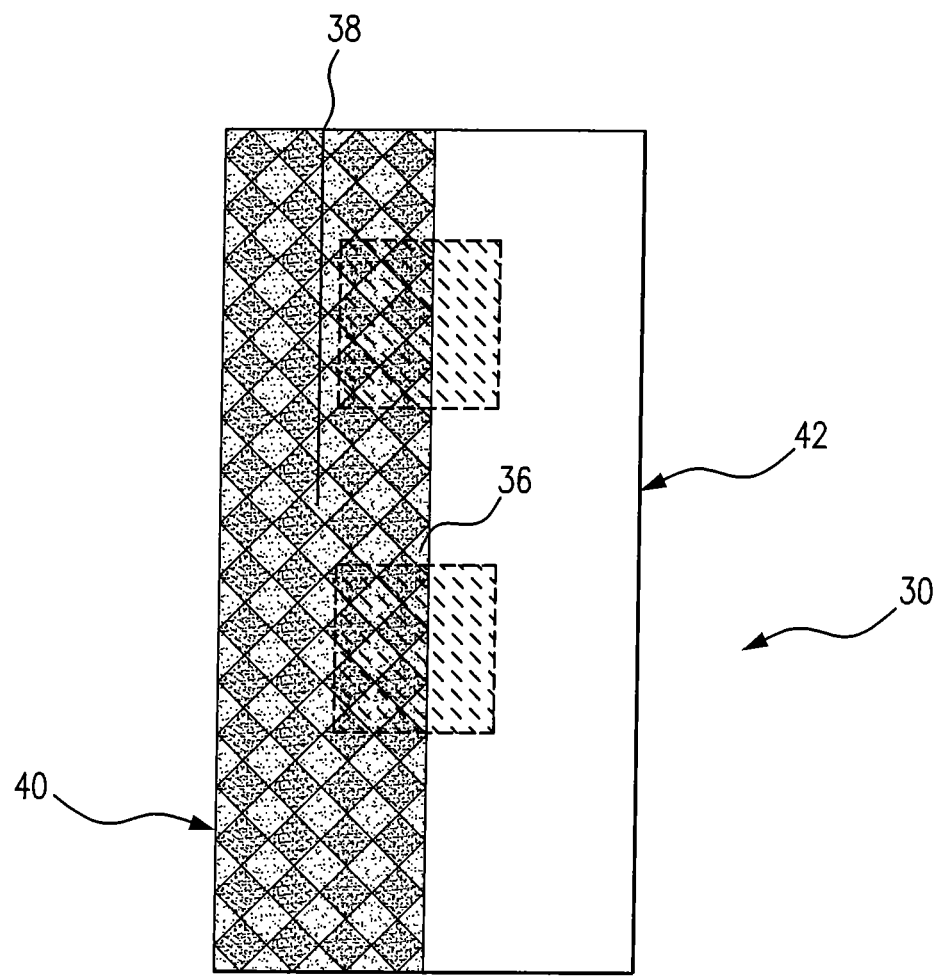
FIG. 3 is a bottom view of the plastic strip of FIG. 2.

A metalized layer 36 is formed over all, or over selected portions, of the first surface 34 resulting in a reflective pattern. FIG. 3 illustrates the plastic substrate 30 in a bottom view showing a pattern 38 corresponding to the peaks and valleys of the embossed structure in a first portion 40 and the absence of the peaks and valleys in a non-embossed second portion 42. The patterned metallization layer 36 may overlie all of selected regions of one or both of the first portion 40 and the second portion 42. Additional security features may be etched directly into either side of the plastic strip 30 by laser ablation. Such additional security features may include an issuer's name and/or logo, unique words, numbers, pictures or the like.

Figure 4:
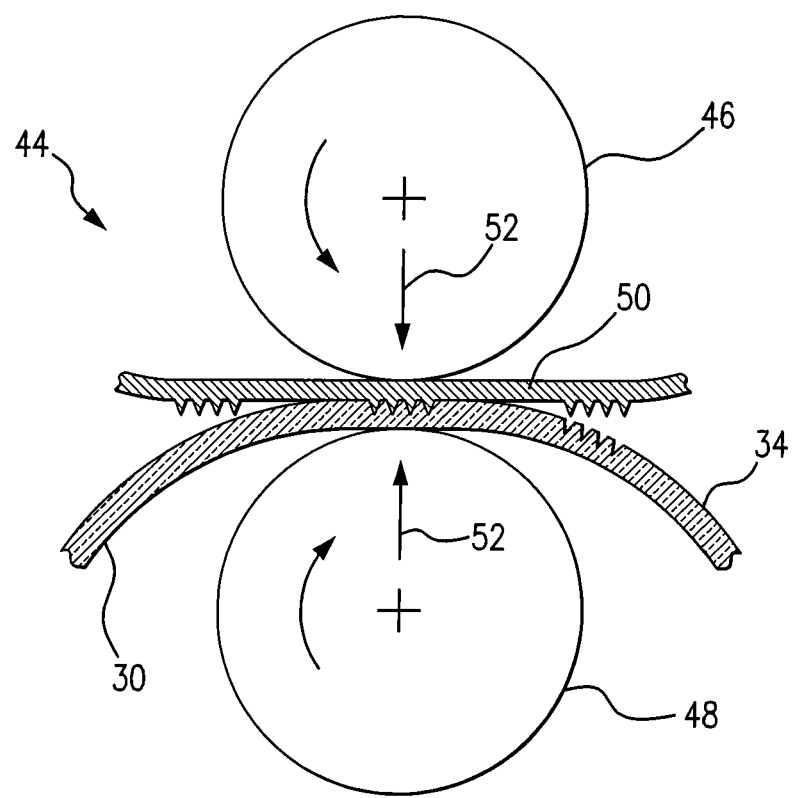
FIG. 4 illustrates a method to manufacture the plastic strip of FIGS. 2 and 3.

A method for the manufacture of the plastic substrate 30 illustrated in FIGS. 2 and 3 includes the steps of compounding resin constituents having, by weight, 50%-99% of polycarbonate as the polymer, 1%-40% of carbon black or other additive to enhance laser engraving, and optionally 1%-30% of pigment as colorant to form an extrudable resin. The resin is extruded into an optically transparent strip using pressure and heat. Typically, the strip will exit the extruder at a temperature of between 120° C. and 320° C. and preferably between 145° C. and 320° C. With reference to FIG. 4, the extruded strip is directed to a pair of rolls 44 for embossing while at a temperature above 120° C. and preferably between 145° C. and 210° C. Typically, the time from exiting the extruder to entering the embossing rolls is under three seconds. Rolls 46 and 48 are used in conjunction with a textured image 50 to create the optically variable device 32. The spacing between first roll 46 and second roll 50 is effective to reduce the thickness of the plastic substrate by up to 50% producing a compressive force 52 applied at the roll nip forcing the mirror image of the textured image 50 pattern into first surface 34 of the plastic substrate. On exiting the pair of rolls 44, the thermoplastic strip containing the embossed optically variable device is cooled and available for further processing, such as metallization and laser engraving.

Alternatively, the plastic substrate 30 is not formed from an optically transparent material and is translucent or opaque. In which case, the security features are viewed through the card or other structure bonded to the substrate.

One or more embodiments of the present invention have been described. Nevertheless, it will be understood that various modifications may be made without departing from the spirit and scope of the invention. For example, other thermoplastic resins may be used in the extrusion process to create a film or sheet. Accordingly, other embodiments are within the scope of the following claims.

What is claimed is:

1. A method for the manufacture of a polymer strip useful to secure information contained within a secure card or document, comprising the steps of:

providing a first roller and a second roller spaced apart from one another by a spacing distance;

providing a textured image strip, independent from the first roller and the second roller, and having a textured image, positioned on a first surface of the textured image strip, that is an outward extending mirror image of an optically variable device;

extruding a mechanically deformable, optically transparent polymer resin to form an optically transparent strip having a first strip surface and a second strip surface parallel to the first strip surface;

rotating said first roller in a first direction and said second roller in a second and opposite direction so as to feed said optically transparent strip and said textured image strip between said spacing distance, in a manner wherein the first surface of the textured image strip and the optically transparent strip come into contact, so as to compress optically transparent strip with a force sufficient to reduce a thickness of the optically transparent strip by up to 50%, thereby embossing said optically variable device into the first surface of said optically transparent strip.

2. The method of claim 1 including selecting said polymer resin to contain polycarbonate.

3. The method of claim 2 wherein said optically transparent strip exits an extruder at a temperature of between 120° C. and 320° C.

4. The method of claim 3 wherein said optically transparent strip is embossed at a temperature of between 145° C. and 210° C.

5. The method of claim 3 wherein a time from exiting said extruder until said embossing step is effective to prevent said optically transparent strip from cooling to a temperature below 120° C.

6. The method of claim 5 wherein said time is less than 3 seconds.

7. The method of claim 1 including bonding said optically transparent strip to a face of said card following embossing.

8. The method of claim 1 wherein the optically transparent polymer resin has an additive effective to facilitate laser engraving.

9. The new method of claim 1 wherein having an additive effective to faciliate laser engraving.

10. the method of claim 9 wherein the additive is carbon black.

11. The method of claim 9 further including the step of laser engraving at least one security feature into said optically transparent strip.

12. the method of claim 11 further including the step of metalizing at least a portion of said optically variable device.

13. The method of claim 1 wherein the length of the textured image of the textured image strip is greater than a circumference of the first roller and greater than a circumference of the second roller.

* * * * *